(12) United States Patent
Patel

(10) Patent No.: US 6,341,062 B1
(45) Date of Patent: Jan. 22, 2002

(54) THERMAL TRANSFER HINGE FOR HINGED MOBILE COMPUTING DEVICE AND METHOD OF HEAT TRANSFER

(75) Inventor: Janak G. Patel, South Burlington, VT (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/519,558

(22) Filed: Mar. 6, 2000

(51) Int. Cl.⁷ .................................................. G06F 1/20
(52) U.S. Cl. ...................... 361/687; 361/704; 165/80.4; 165/104.21
(58) Field of Search ................................. 361/687, 700, 361/704, 707, 699; 174/15.1, 15.2; 165/104.33, 80.2–80.4, 104.21; 364/708.1; 62/259.2

(56) References Cited

U.S. PATENT DOCUMENTS

| | | | |
|---|---|---|---|
| 5,178,159 A | * 1/1993 | Christian | 128/772 |
| 5,216,202 A | * 6/1993 | Yoshida et al. | 174/36 |
| 5,598,320 A | 1/1997 | Toedtman et al. | 361/687 |
| 5,621,613 A | 4/1997 | Haley et al. | 361/687 |
| 5,646,822 A | 7/1997 | Bhatia et al. | 361/687 |
| 5,647,429 A | 7/1997 | Oktay et al. | 165/104.26 |
| 5,764,483 A | * 6/1998 | Ohashi et al. | 361/699 |
| 5,781,409 A | * 7/1998 | Mecredy, III | 361/687 |
| 5,847,925 A | 12/1998 | Progl et al. | 361/687 |
| 5,880,929 A | 3/1999 | Bhatia | 361/687 |
| 5,910,883 A | * 6/1999 | Cipolla et al. | 361/687 |

OTHER PUBLICATIONS

"Thermally Conductive Hinge for Notebook Computers," by L. Buller, B. Kerrigan, and J.L. Rice, IBM Technical Disclosure Bulletin, vol. 39, No. 05, pp. 227–229, May 1996.

* cited by examiner

*Primary Examiner*—Leo P. Picard
*Assistant Examiner*—Hung Van Duong
(74) *Attorney, Agent, or Firm*—Downs Rachlin & Martin PLLC

(57) ABSTRACT

A thermal hinge (20) designed for use in a hinged mobile computing device (22) having a base (24) and a display unit (26). The thermal hinge includes a first block (120) and a second block (122), both made from copper or other metal of equal or higher thermal conductivity. The blocks are mounted in the base and display unit, respectively, adjacent the rotational axis (30) of the hinge assembly (28) that permits the display unit to move between open and closed positions relative to the base. The first block is connected to a first heat pipe (102) which is attached to a heat-generating device (32), and the second block is connected to a second heat pipe (104) which is connected to a heat dissipating device (34). At least one, and preferably a plurality of, braided wire(s) (160) are connected to the first and second blocks and conduct heat therebetween.

22 Claims, 2 Drawing Sheets

THERMAL TRANSFER HINGE FOR HINGED MOBILE COMPUTING DEVICE AND METHOD OF HEAT TRANSFER

FIELD OF THE INVENTION

The invention pertains to devices for removing heat from an electronic component and, more particularly, to devices for transferring heat between the base and the display of a hinged mobile computing device.

BACKGROUND OF THE INVENTION

Mobile computing devices such as notebook and sub-notebook computers are shrinking in size, i.e., they are becoming lighter, smaller and thinner. At the same time, the processing power of such computers continues to increase. Because the heat output of microprocessors, disk drives, power supplies and other components increases with increased processing power, challenges exist for computer manufacturers regarding dissipation of heat from notebook and sub-notebook computers. The thermal ceiling for portable computers may be approaching the saturation point. Adding large passive heatsinks and/or active cooling devices such as fan/heatsink combinations to remove heat defeats the goals of a small, light, thin computer with a long battery life. In addition, controlling temperature is also important for proper functionality, reliability and human comfort (i.e., the device cannot be unacceptably warm to the human touch).

Because the base of a hinged mobile computing device generates substantially more heat than the display unit, it is known to conduct heat from heat-generating components in the base such as a microprocessor to a heat dissipating device in the display unit. Heat is conducted via a heat pipe in thermal contact with the heat-generating component, across a thermal hinge at the location where the base is attached to the display unit, and then to a heat dissipating device via a second heat pipe. Examples of systems of the type are described in U.S. Pat. No. 5,880,929 to Bhatia, U.S. Pat. No. 5,847,925 to Progl et al. and U.S. Pat. No. 5,612,613 to Haley et al.

While such systems generally function effectively, the extent of heat transfer between base and display unit is often not as great as desired because the thermal hinge presents an undesirably large thermal resistance. Also, in some cases reliability of such systems is not as high as may desired. For example, some systems rely on the use of thermal grease for proper thermal hinge operation. This grease can dry out, escape, become contaminated with dirt, or otherwise not function as intended.

The system described in U.S. Pat. No. 5,847,925 includes heat pipes in the base and display unit which include sections that are bent so as to extend in coaxial relationship and parallel to the rotational axis of the hinges of the computing device. The ends of the heat pipes are received in a hollow tube made from a flexible, woven fabric having a relatively high thermal conductivity. The ends of the heat pipes are attached to the tube using a thermal epoxy. As the display unit is opened and closed the relative movement of the heat pipe ends is transferred to the flexible tube so as to cause the tube to be torqued along its long axis. It is believed this torquing of the flexible tube can, over time, cause reliability problems. Furthermore, the extent of heat transfer across the flexible tube is less than what is desired in some circumstances.

SUMMARY OF THE INVENTION

One aspect of the present invention is a thermal transfer hinge for transferring heat in a mobile computing device having a base, a display unit and a hinge assembly attached to the base and display unit for permitting the display unit to move between open and closed positions relative to the base, the hinge assembly having a rotational axis. The hinge comprises a first heat pipe, a second heat pipe, and first and second blocks having a thermal conductivity at least as high as copper. The first block is connected to the first heat pipe and the second is connected to the second heat pipe. The hinge also includes at least one braided metal wire attached to the first block and the second block so as to be in thermal contact with the first block and the second block. The at least one braided metal wire has a thermal conductivity at least as high as copper.

Another aspect of the present invention is a thermal transfer hinge for use in a mobile computing device as described above which includes a first heat pipe, a second heat pipe, a first block connected to the first heat pipe, and a second block connected to the second heat pipe. The hinge also includes structure for mounting the first block to the base in a first position and for mounting the second block to the display unit in a second position. In addition, the hinge has at least one braided metal wire attached to the first block and the second block so that when the first block is mounted in the first position to the base and the second block is mounted in the second position to the display unit, the at least one braided wire is caused to fold along its length around an axis extending parallel to the rotational axis of the hinge assembly when the display unit is moved between the open and closed positions.

Yet another aspect of the present invention is a mobile computing device having a thermal transfer hinge. The device comprises a base, a display unit, a hinge assembly attached to the base and the display unit for permitting the display unit to move relative to the base between an open position and a closed position, the hinge assembly having a rotational axis. The device also includes a thermal transfer hinge including a first block positioned in the base and a second block positioned in the display unit. The hinge also includes a first heat pipe positioned in the base and a second heat pipe positioned in the display unit. The first heat pipe is attached to the first block and the second heat pipe is attached to the second block. In addition, the hinge has at least one braided metal wire attached to said first block and said second block.

Still another aspect of the present invention is a method of transferring heat between a base and a display unit of a hinged mobile computing device which includes a hinge assembly attached to the base and display unit, the hinge assembly having a rotational axis. The method comprises as a first step transferring heat from a component in the base to a first portion of the base adjacent the rotational axis. Next, heat is transferred from the first portion to a second portion of the display unit adjacent the rotational axis via at least one braided metal wire having a thermal conductivity at least as high as copper. Finally, heat is transferred from the second portion to a heat-dissipating device in the display unit.

DETAILED DESCRIPTION OF THE PRESENT INVENTION

Figure 1:
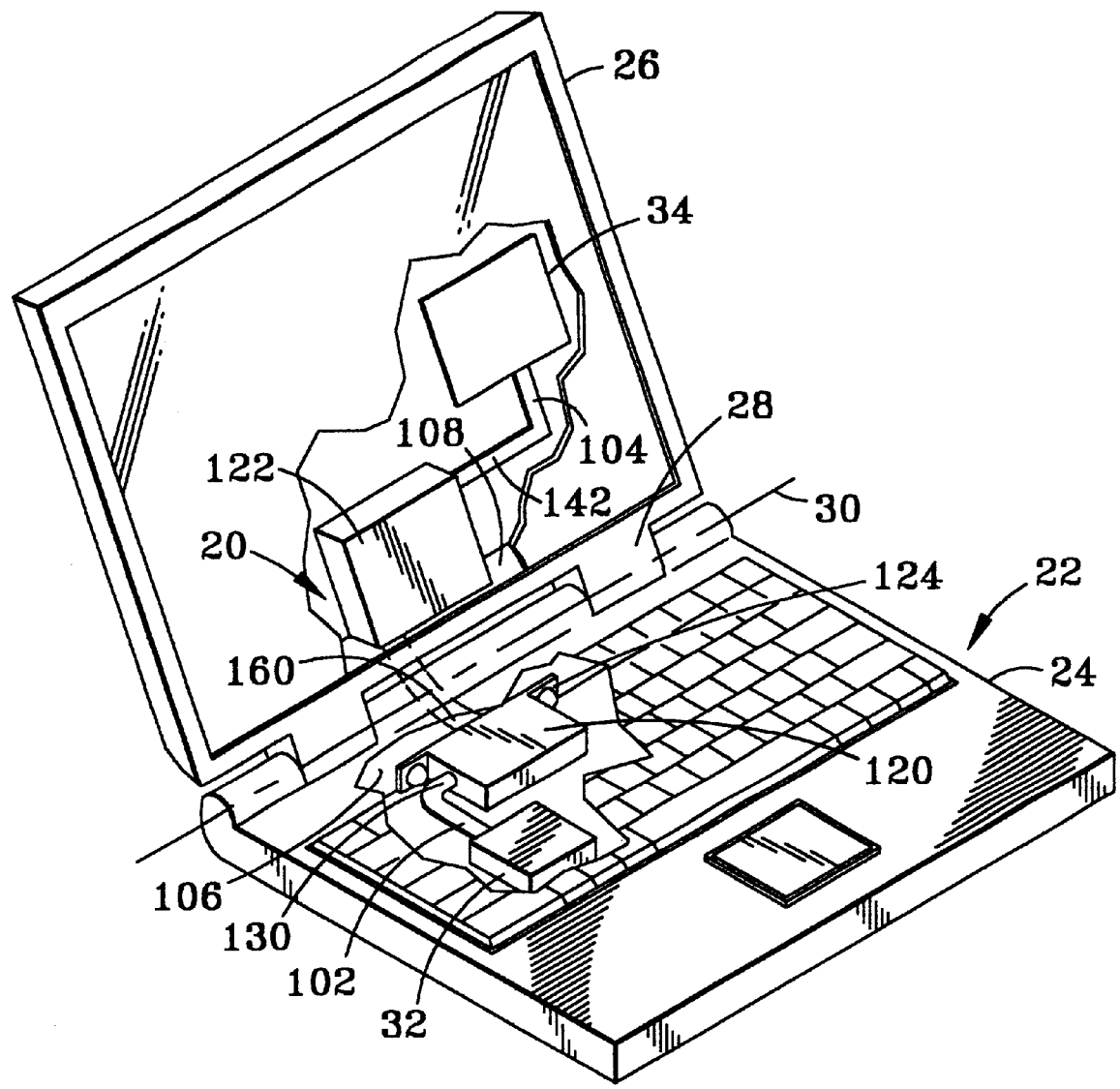
FIG. 1 is a schematic perspective view of a mobile computing device including the heat transfer thermal hinge of the present invention.
Figure 2:
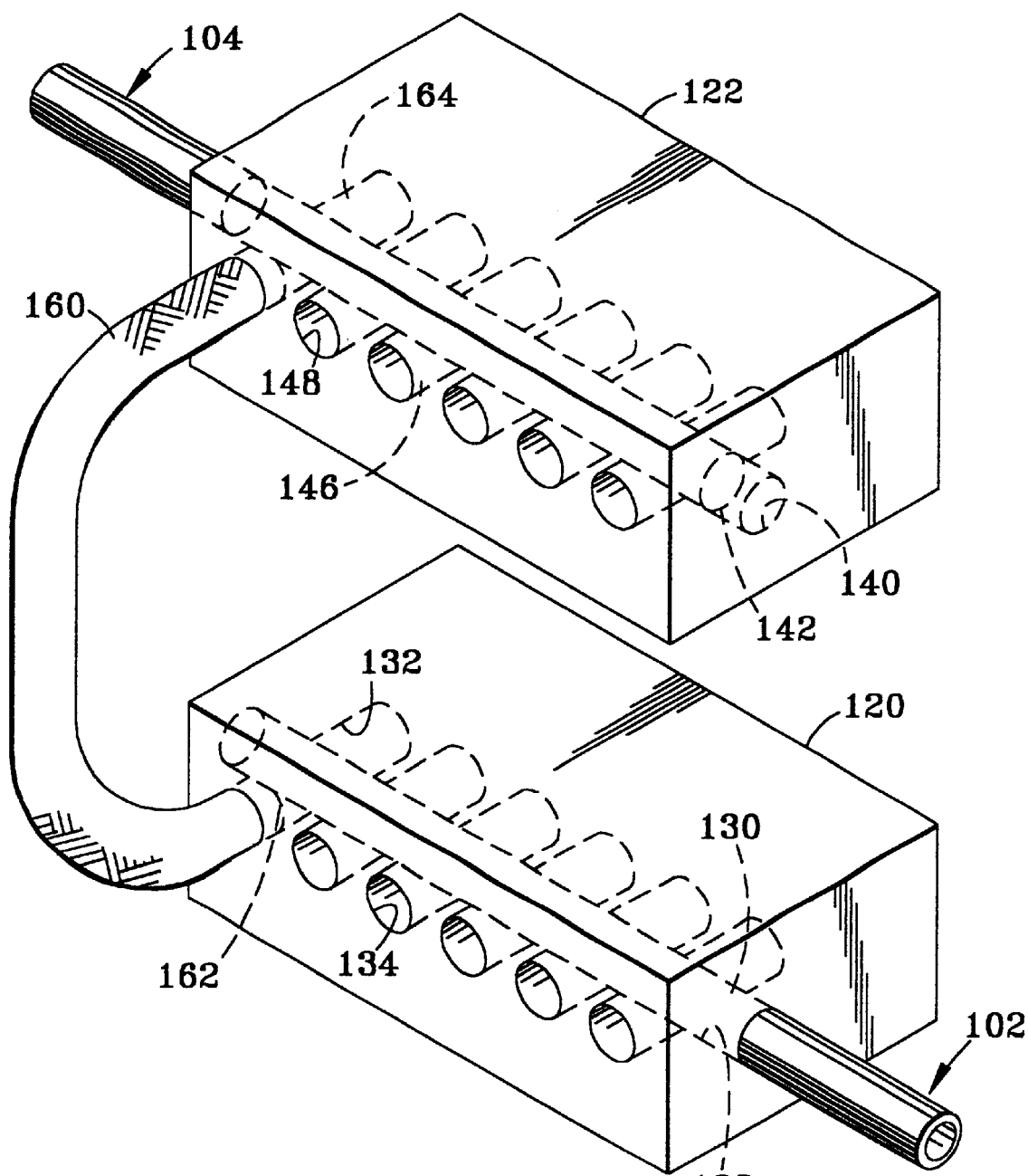
FIG. 2 is a perspective view of the thermal transfer hinge of the present invention.

Referring to FIGS. 1 and 2, the present invention is a thermal transfer hinge 20 designed for use in a mobile computing device 22. The latter includes a base 24 and a display unit 26. A hinge assembly 28 is attached to base 24 and display unit 26 for permitting the display unit to move between an open position, as shown, and a closed position, not shown, relative to the base. Hinge assembly 28 has a rotational axis 30. Base unit 24 includes a heat-generating component 32, such as a microprocessor, a disk drive or a power supply. Display unit 26 includes a heat-dissipating device 34, such as a metal plate or a finned heat sink.

Thermal transfer hinge 20 includes heat pipe 102 that is connected to heat-generating device 32 and heat pipe 104 that is connected to heat-dissipating device 34. Heat pipe 102 is sized and positioned to extend from heat-generating device 32 to a position adjacent rear wall 106 of base 24. Heat pipe 104 is sized and positioned to extend from heat dissipating device 34 to a position adjacent rear wall 108 of display unit 26. Heat pipes 102 and 104 are typically pipes made from a material having a relatively high thermal conductivity. However, structures other than pipe which are capable of transferring heat effectively from heat generating component 32 may be used as heat pipes 102 and 104.

Thermal transfer hinge 20 also includes blocks 120 and 122, which are preferably made from a copper or a material having a thermal conductivity at least as high as copper, i.e., a thermal conductivity of at least 350–400 watt/m-K°. In some cases it may be acceptable to use materials having a thermal conductivity lower than that of copper for blocks 120 and 122. Block 120 is positioned at or adjacent rear wall 106, typically at a central position, although it may be positioned anywhere along the rear wall. Block 122 is positioned at or adjacent rear wall 108 opposite block 120. The dimensions of blocks 120 and 122 will vary depending upon the available space within base 24 and display unit 26, respectively, weight constraints and other factors that will be apparent in view of the description of thermal transfer hinge 20 to follow. However, in one embodiment, blocks 120 and 122 are about 60 mm long, 40 mm wide and about 25 mm thick.

Block 120 has a bore 128 sized to receive end 130 of heat pipe 102. Preferably, bore 128 extends substantially entirely through block 120, as shown, although in some cases it may be desirable to size bore 128 so that it extends only partially through the block. Heat pipe end 130 is attached to block 120 by brazing, soldering or through the use of thermally conductive epoxy. The diameter of bore 128 relative to heat pipe end 130 is selected with these attachment processes in mind.

Block 120 also includes at least one, and preferably multiple, bores 132, each having an open end 134. Bores 132 extend from open ends 134 to bore 128, and may extend past bore 128 if desired. Bores 132 are either coaxial with bore 128 at the point of intersection with bore 128, or are positioned slightly above or below bore 128. Bores 132 typically extend in parallel and lie along a common plane, although other configurations are encompassed by the present invention. The number of bores 132 included in block 120 will typically influence the overall length of the block.

Block 122 has a bore 140 sized to receive end 142 of heat pipe 104. Like bore 128, bore 140 preferably extends substantially entirely through block 122, as shown, although in some cases it may be desirable to size bore 140 so that it extends only partially through the block. Heat pipe end 142 is attached to block 122 by brazing, soldering or through the use of thermally conductive epoxy. The diameter of bore 140 relative to heat pipe end 142 is selected with these attachment processes in mind.

Block 122 also includes at least one, and preferably multiple, bores 146, each having an open end 148. Bores 146 extend from open ends 148 to bore 140, and may extend past bore 140 if desired. Bores 146 are either coaxial with bore 140, at the point of intersection with bore 140, or are positioned slightly above or below bore 140. Bores 146 typically extend in parallel and lie along a common plane, although other configurations are encompassed by the present invention. The number of bores 146 included in block 122 will typically influence the overall length of the block Block 120 is attached to rear wall 106 so that open ends 134 confront the rear wall. A slot or series of openings (not shown) is provided in rear wall 106, with the slot or openings being sized and positioned so that open ends 134 open out to the outer surface (not shown) of the rear wall. A similar slot or openings (not shown) is provided in display unit 26 adjacent open ends 148.

Blocks 120 and 122 are mounted to rear wall 106 and rear wall 108, respectively, with structure 124 which may comprise screws, mounting brackets or other conventional attachment devices. The primary requirement for structure 124 used to secure blocks 120 and 122 to rear walls 106 and 108, respectively, is that the blocks be held in secure, fixed relation to the rear walls for the lifetime of computing device 22.

Thermal transfer hinge 20 includes at least one, and preferably several, braided wires 160. First end 162 of braided wire 160 is received in a bore 132 in block 120 and second end 164 of the braided wire is received in bore 146 in block 122. Braided wire 160 is secured within bores 132 and 146 in blocks 120 and 122, respectively, by brazing, soldering or through the use of thermally conductive epoxy. Bores 132 and 146 are sized with these attachment processes in mind. Preferably, ends 162 and 164 are impregnated with solder, brazing material or other materials to render the ends solid before insertion into bores 132 and 146, respectively.

Braided wire 160 is preferably made from copper, or other metals having a thermal conductivity at least as high as copper. However, materials having a thermal conductivity lower than copper may also be used. The diameter of braided wire 160 may vary, but in one embodiment its diameter is about 8.25 mm. The number of braided wires 160 used will be influenced by the desired conduction thermal resistance for thermal transfer hinge 20, with the resistance decreasing as more braided wires are used. In one embodiment of the present invention, six braided wires 160 are used. As a consequence of this use of plural braided wires 160, it is possible to achieve a conduction thermal resistance that is significantly lower than prior art devices using a single thermal transfer element, e.g., the device described in U.S. Pat. No. 5,847,925. This, in turn, permits increased heat transfer between base 24 and display unit 26.

By mounting blocks 120 and 122 as described above, the length of braided wire 160 folds around rotational axis 30, or an axis extending parallel thereto, as display unit 26 is moved between open and closed positions. Because this type of folding movement can occur many times without affecting the integrity of braided wire 160, or its attachment to blocks 120 and 122, thermal transfer hinge 20 is highly reliable.

Computing device 22 is illustrated with only one thermal transfer hinge 20. However, it is to be appreciated that multiple hinges 20 may be used on computing device 22. For example, it may be desirable to connect a first heat-generating element such as a microprocessor to one hinge 20 and a second heat-generating element such as a power supply to a second hinge 20.

Thermal transfer hinge 20 is illustrated as including heat pipes 102 and 104 which are positioned on single imaginary planes in base 24 and display unit 26. However, it is to be appreciated that multiple heat pipes may be provided on vertically spaced imaginary planes in base 24 and display unit 26, including with multiple heat pipes in each plane, if desired.

The preceding description of the present invention, and accompanying drawings, is illustrative and not limiting, and various changes in the size, shape, materials, components and other features of the present invention, and the method of making and using the invention, may be made without departing from the scope and spirit of the invention.

What is claimed is:

1. A thermal transfer hinge for transferring heat in a mobile computing device having a base, a display unit and a hinge assembly attached to the base and display unit for permitting the display unit to move between open and closed positions relative to the base, the hinge assembly having a rotational axis, the thermal transfer hinge comprising:
   a. a first heat pipe;
   b. a second heat pipe;
   c. a first block having a thermal conductivity at least as high as copper, said first block connected to said first heat pipe;
   d. a second block having a thermal conductivity at least as high as copper, said second block connected to said second heat pipe; and
   e. at least one braided metal wire attached to said first block and said second block so as to be in thermal contact with said first block and said second block, said at least one braided metal wire having a thermal conductivity at least as high as copper.

2. A hinge according to claim 1, wherein said at least one braided metal wire comprises a plurality of braided wires.

3. A hinge according to claim 1, wherein said at least one braided metal wire is made from copper.

4. A hinge according to claim 1, wherein said first block includes structure for mounting said first block to the base in a first position and said second block includes structure for mounting said second block to the display unit in a second position, further wherein said at least one braided metal wire is attached to said first block and said second block so that when said first block is mounted in said first position to the base and said second block is mounted in said second position to the display unit, said at least one braided wire is caused to fold along its length around an axis extending parallel to the rotational axis of the hinge assembly when the display unit is moved between the open and closed positions.

5. A hinge according to claim 1, wherein said first block and said second block are made from copper.

6. A thermal transfer hinge for transferring heat in a mobile computing device having a base, a display unit and a hinge assembly attached to the base and display unit for permitting the display unit to move between open and closed positions relative to the base, the hinge assembly having a rotational axis, the thermal transfer hinge comprising:
   a. a first heat pipe;
   b. a second heat pipe;
   c. a first block connected to said first heat pipe;
   d. a second block connected to said second heat pipe; and
   e. structure for mounting said first block to the base in a first position and for mounting said second block to the display unit in a second position; and
   f. at least one braided metal wire attached to said first block and said second block so that when said first block is mounted in said first position to the base and said second block is mounted in said second position to the display unit, said at least one braided wire is caused to fold along its length around an axis extending parallel to the rotational axis of the hinge assembly when the display unit is moved between the open and closed positions.

7. A hinge according to claim 6, wherein said at least one braided wire has a thermal conductivity at least as high copper.

8. A hinge according to claim 6, wherein said at least one braided metal wire comprises a plurality of braided wires.

9. A mobile computing device having a thermal transfer hinge, the device comprising:
   a. a base;
   b. a display unit;
   c. a hinge assembly attached to said base and said display unit for permitting said display unit move relative to said base between an open position and a closed position, said hinge assembly having a rotational axis;
   d. a thermal transfer hinge including:
      i. a first block positioned in said base;
      ii. a second block positioned in said display unit;
      iii. a first heat pipe positioned in said base, said first heat pipe being attached to said first block;
      iv. a second heat pipe positioned in said display unit, said second heat pipe being attached to said second block; and
      v. at least one braided metal wire attached to said first block and said second block.

10. A device according to claim 9, wherein said first block is positioned in said base, said second block is positioned in said display unit, and said at least one braided metal wire is attached to said first block so that when said display unit is caused to move between said open and closed positions said at least one braided metal wire is caused to fold around an axis that extends substantially parallel to said rotational axis.

11. A device according to claim 9, wherein said first block and said second block are made from a material having a thermal conductivity at least as high as copper.

12. A device according to claim 9, wherein said first block and said second block are made from copper.

13. A device according to claim 9, wherein said at least one braided wire is made from a material having a thermal conductivity at least as high as copper.

14. A device according to claim 9, wherein said at least one braided wire is made from copper.

15. A device according to claim 9, wherein said at least one braided wire comprises a plurality of braided wires.

16. A device according to claim 9, further including a heat-generating component attached to said first heat pipe.

17. A device according to claim 9, further including a heat-dissipating device attached to said second heat pipe.

18. A device according to claim 9, further including a plurality of said thermal transfer hinges.

19. A device according to claim 18, wherein said first heat pipe of one of said thermal transfer hinges lies on a first plane and said first heat pipe of a second one of said thermal transfer hinges lies on a second plane spaced from said first plane.

20. A method of transferring heat between a base and a display unit of a hinged mobile computing device which includes a hinge assembly attached to the base and display unit, the hinge assembly having a rotational axis, the method comprising the steps of:
   a. transferring heat from a component in the base to a first portion of the base adjacent the rotational axis;
   b. transferring heat from said first portion to a second portion of the display unit adjacent the rotational axis via at least one braided metal wire having a thermal conductivity at least as high as copper; and c. transferring heat from said second portion to a heat-dissipating device in the display unit.

21. A method according to claim 20, wherein step b is performed using a plurality of braided metal wires having a thermal conductivity at least as high as copper.

22. A method according to claim 20, wherein said step b is performed so that the length of the at least one braided metal wire is positioned to fold around an axis extending parallel to the rotational axis of the hinge assembly when the display unit is opened and closed relative to the base.

* * * * *